Figure 1:
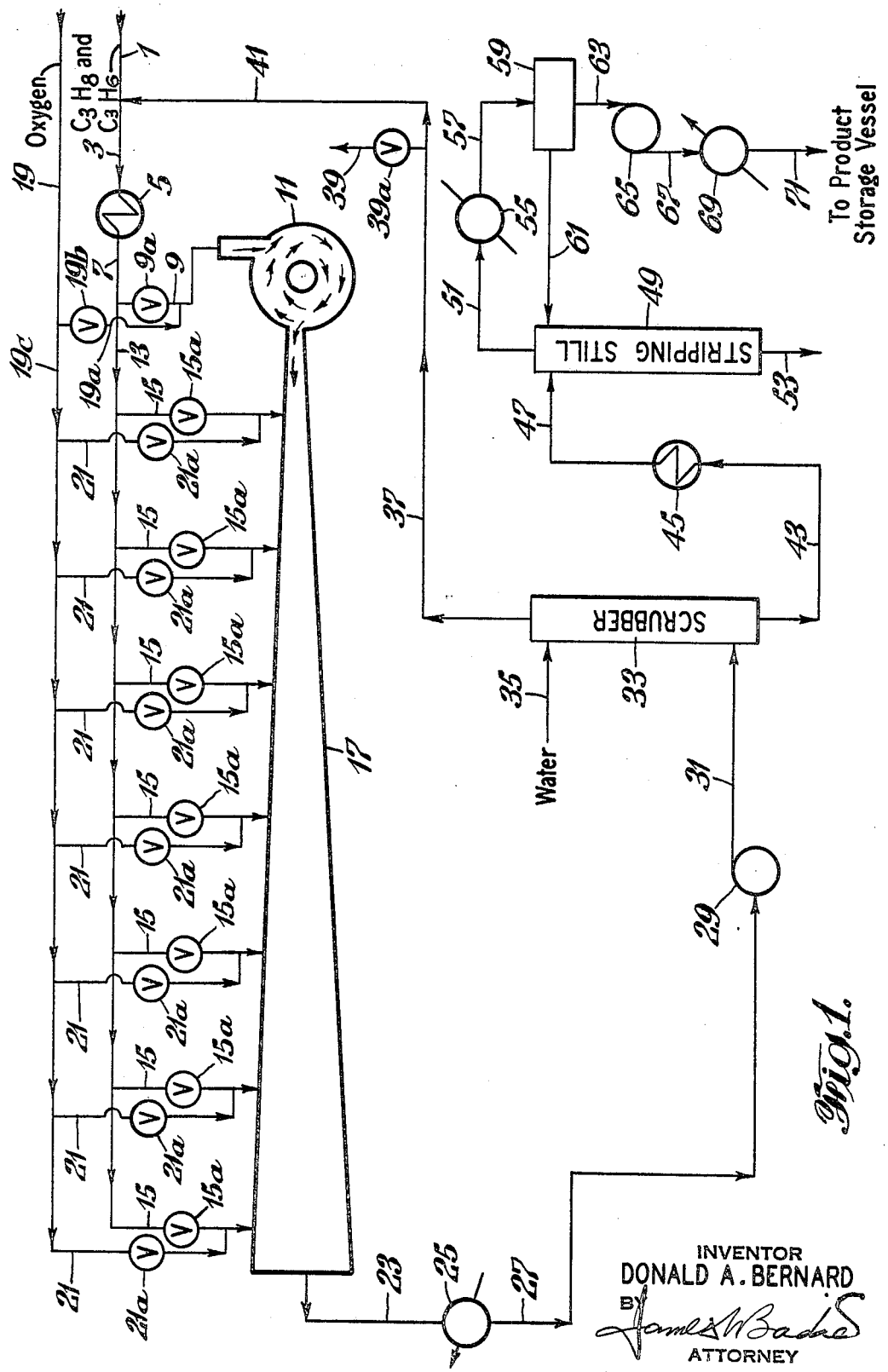

INVENTOR
DONALD A. BERNARD
ATTORNEY

United States Patent Office 3,483,229
Patented Dec. 9, 1969

3,483,229
NONCATALYTIC VAPOR-PHASE OXIDATION OF HYDROCARBONS IN A DILUTION REACTOR
Donald A. Bernard, South Charleston, W. Va., assignor to Union Carbide Corporation, a corporation of New York
Filed Aug. 16, 1965, Ser. No. 479,964
Int. Cl. C07d 5/00, 3/00, 1/02
U.S. Cl. 260—348.5
34 Claims

ABSTRACT OF THE DISCLOSURE $C_2$ to $C_4$ saturated and/or unsaturated aliphatic hydrocarbons are oxidized to produce the corresponding olefin oxide. The oxidation reaction is carried out in two reactors connected in series and communicating with one another. Part of the feed is introduced to the first reactor where the reactor and the reaction product are completely back-mixed and where the oxidation is effected at essentially adiabatic conditions. The effluent from the back-mixed reactor flows into a tubular reactor and the remaining feed is introduced into the tubular reactor at a plurality of injection points disposed along this tubular reactor. The combined reactors are referred to as "dilution reactors" and the oxidation reaction is effected at a dilution ratio of 5:1 to about 100:1. The dilution ratio refers to the ratio of the amount of gaseous material already flowing past each injection point to the amount of feed injected to the reactor at that point.

---

This invention relates to the non-catalytic, vapor-phase oxidation of hydrocarbons and a reactor therefor. In one aspect, the present invention is directed to a process for noncatalytic, vapor-phase oxidation of $C_2$ to $C_4$ saturated and/or unsaturated aliphatic hydrocarbons to produce the corresponding olefin oxide. In another aspect, this invention relates to a novel reactor system, hereafter referred to as a "dilution reactor" for carrying out the process of this invention.

For many years the oxidation of hydrocarbons has been the subject of numerous studies and investigations that have culminated in several patents and technical papers. Some of these efforts have been directed to the production of oxygenated organic compounds such as aldehydes, acids, ketones, alcohols, etc. Other efforts in this area have been concentrated on the production of olefin oxide directly from the oxidation of saturated or unsaturated hydrocarbons, or mixtures thereof.

Various methods have heretofore been proposed for carrying out these prior art processes both catalytically and noncatalytically, in the liquid phase as well as in the vapor phase. There are several patents which relate to the oxidation of $C_2$ to $C_4$ saturated or unsaturated aliphatic hydrocarbons to produce the corresponding olefin oxide. A significant pertinent prior art which represents one of the early advances and contributions in the area of direct, non-catalytic, vapor-phase oxidation of hydrocarbons is U.S. 2,530,509, issued to Gerhard A. Cook on Nov. 21, 1950. This patent is directed to the production of propylene oxide by the direct oxidation of propane, propylene, or mixtures of the same, with oxygen or any gas containing molecular oxygen. It recognizes the significance of large gas contacting surface relative to the amount of free reaction space in optimizing the yield and productivity of propylene oxide in the process described therein.

Another contribution in this field is an article entitled "Chemicals from Hydrocarbons by Vapor-Phase Oxidation" by Jenning H. Jones and Merrell R. Fenske, Industrial and Engineering Chemistry, vol. 51, No. 3, March 1959, pages 262–266. According to this article, hydrocarbons ranging from ethane to petroleum wax can be oxidized at a temperature of from 300° C. to 650° C. and a pressure ranging from atmospheric to 60 p.s.i.g., in the presence of dispersion of inert solids. The oxygen is introduced into the reactor at multiple points to help maintain uniform temperature distribution by preventing great temperature differences from occurring at any one point.

A major recent advance in the area of non-catalytic, vapor-phase oxidation of $C_2$ to $C_4$ hydrocarbon is described in U.S. 3,132,156 issued to Russel C. Lemon et al. on May 5, 1964. It recognized the need for a "critical balance" of the reaction environment and the effect of "back-mixing" in the reactor to maintain essentially isothermal conditions and substantially homogeneity of reactants and reaction products throughout the reactor.

Notwithstanding the abundance of patents and literature in this area, many ramifications of this work remain to be explored and workers continue to strive toward optimization of this process in an effort to improve its efficiency and/or increase the selectivity with respect to the production of desirable products, i.e., olefin oxides. The present invention represents another major advance in this area. However, before describing the present invention, it is believed that a brief description of the principles and discoveries which led to the development of the process of this invention and the reactor which is uniquely employed therefor will aid in understanding the instant invention.

As was previously mentioned, it is highly advantageous to carry out the vapor-phase oxidation of hydrocarbons under back-mixed conditions by which is meant that the reactants and the products are thoroughly intermixed as described in the aforementioned patent to Lemon et al. This permits operation at essentially isothermal conditions and insures substantially constant concentration of the reactants and products throughout the reaction zone. Accordingly, the reaction rate remains constant throughout the reaction zone and temperature control is less difficult than in the case of a variable reaction rate. Furthermore, the oxidation reaction results in the production of the olefin oxide in good yield and efficiency.

One inherent disadvantage of the use of back-mixed reactors for the vapor-phase oxidation of hydrocarbons is the difficulty of scaling-up these reactors to commercial size. Because the contact time is of the order of about one second, very high internal velocities are required in a commercial back-mixed reactor in order to insure adequate mixing of the reactants and the products so that there is substantially no concentration gradient throughout the reactor. This, of course, necessitates the application of large mechanical power to maintain the necessary high degree of circulation. Superimposed upon this large power requirement is an additional power which is necessary to overcome the pressure drop caused by the use of packing materials in such reactors. In commercial size back mixed reactors the ratio of gas-contacting surface relative to the amount of free reaction space is low and packing materials are employed in the reactor to increase this surface. The desirability of increased ratio of gas-contacting surface relative to the amount of free reaction space is well described in the aforementioned Cook patent. Furthermore, said patent also enumerates the various suitable packing materials which can be employed.

Some prior art processes resort to multiple injection of the reactants throughout the reactor in order to distribute the reaction evenly therethrough and to thereby minimize temperature variations through the reactor. However multiple injection of the reactants through the reactor results in variable concentration of the reactants and the products throughout the reactor and increases the difficulty of temperature control therein.

Accordingly, it is an object of this invention to provide a novel and improved process for the non-catalytic, vapor-phase oxidation of $C_2$ to $C_4$ saturated and/or unsaturated aliphatic hydrocarbons to produce the corresponding olefin oxide.

It is another object of this invention to provide a novel reactor and reactor arrangement for the non-catalytic, vapor-phase oxidation of $C_2$ to $C_4$ saturated and/or unsaturated aliphatic hydrocarbons, particularly propane and propylene, to produce the corresponding olefin oxide.

It has now been discovered that a combination of a back-mixed reactor, in series with a tubular reactor provided with a plurality of injection points along its length can provide the conditions which are necessary for optimizing the selectivity of producing olefin oxide.

It has been further discovered that both the process of this invention and the reactor employed therefor are readily amenable to be scaled-up for industrial operation without the attendant limitations which have been associated with the scale-up of the heretofore used reactors.

The combination of the back-mixed reactor and the tubular reactor with multiple injection points will hereafter be referred to as "dilution reactor." Part of the hydrocarbon feed together with oxygen or any gas containing molecular oxygen are introduced into the back-mixed reactor. The remainder of the hydrocarbon together with the remainder of oxygen or the gas containing molecular oxygen are introduced into the tubular reactor through multiple inlets which are disposed along the length of the tubular reactor. The back-mixed reactor in essence serves to initiate the reaction in the dilution reactor and thus no induction period is required in the tubular reactor.

The oxidation of hydrocarbons is an "autocatalytic" reaction by which is meant that the reaction products themselves act to promote the reaction. Thus the reaction products produced in the back mixed reactor serve to promote the reaction in the tubular reactor. The reaction in the dilution reactor occurs at essentially isothermal conditions and the concentration of the reactants and the products remain essentially constant throughout the dilution reactor.

The present invention will be more clearly understood from the following detailed description of the invention particularly in connection with the accompanying drawings wherein like numerals designate like parts. In the drawings: FIGURE 1 is a schematic flow diagram of the process of this invention and also illustrates a side view of the dilution reactor which is employed for the process.

Figure 2:
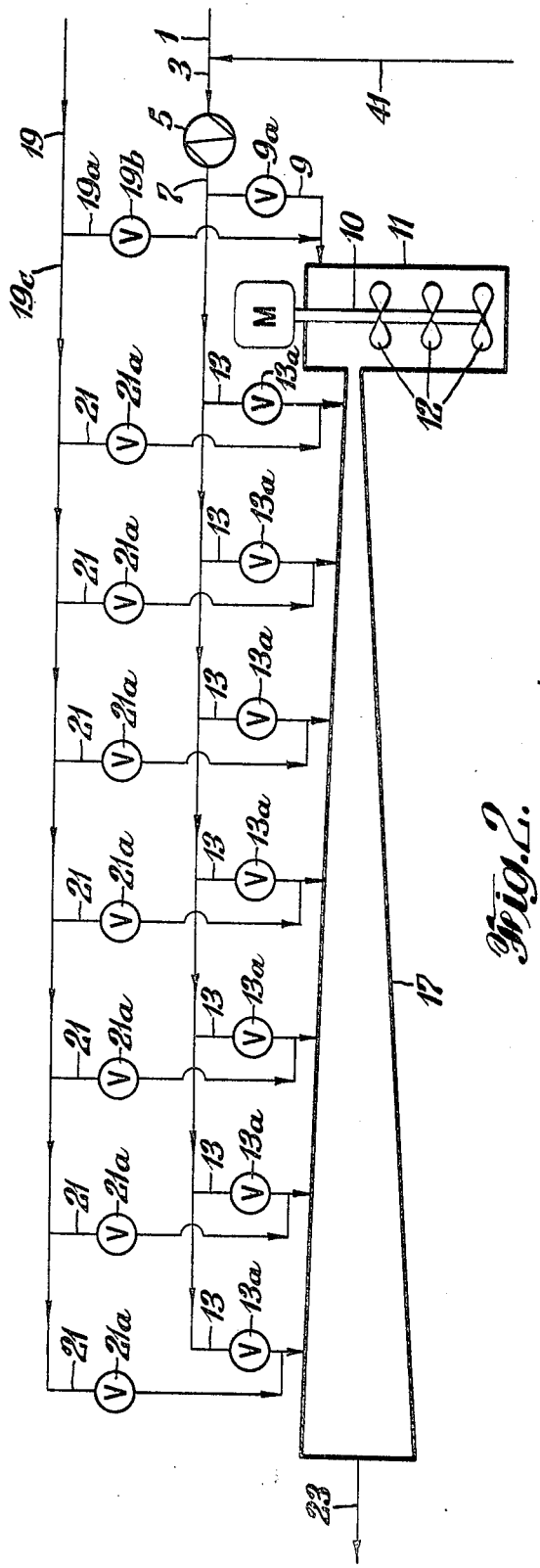
Figure 3:
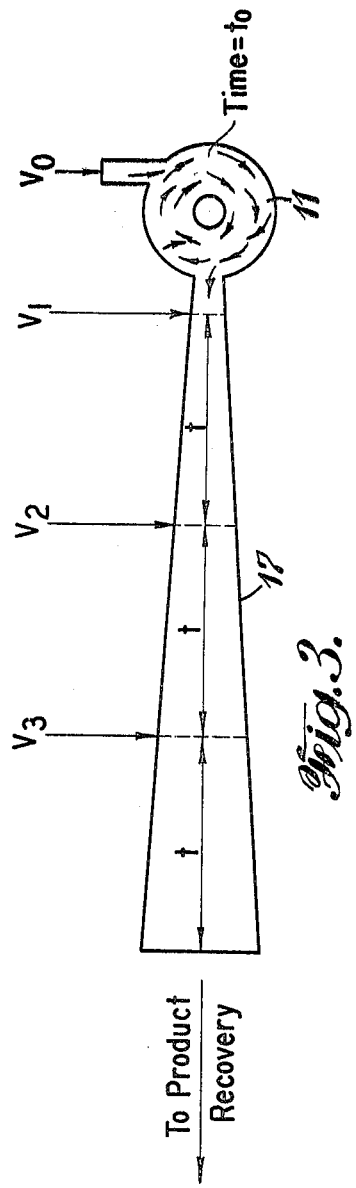

FIGURE 2 is a diagrammatic representation of another embodiment of this invention illustrating a dilution reactor employed herein; and FIGURE 3 is a schematic diagram of a dilution reactor such as that employed in the present invention and illustrating the calculation of the "mean contact time" of the materials in the dilution reactor. The term "mean contact time" will be later defined in this application.

The present invention will herein be described in connection with the oxidation of propane. However, the present invention and the principles discussed herein are of general applicability to the vapor-phase oxidation of saturated and unsaturated aliphatic $C_2$ to $C_4$ hydrocarbons.

Referring to the drawings (FIGURE 1) propane or a mixture of propane and propylene is introduced via line 1 and is combined with the recycle from line 41. The combined materials flow through line 3, heated in heater 5, and leave the heater through line 7. Part of this combined material is introduced via line 9 into a reaction zone 11 wherein the reactants and the products are in back-mixed condition. Reaction zone 11 will hereafter be referred to as back-mixed reactor 11. The feed rate to this reactor is controlled by a valve 9a in said line 9. The remainder of the hydrocarbon flows through header 13 from which issues a plurality of feed lines 15 which enter a tubular reaction zone 17 which is freely communicating with said back mixed reactor 11. The feed rates in each of said feed lines 15 are controlled by individual valves 15a located in said line 15.

Oxygen or any gas containing molecular oxygen is introduced via line 19. Part of this oxygen is introduced via line 19a into the back-mixed reactor 11 after joining said hydrocarbon feed line 9 just upstream of the back mixed reactor. The rate of oxygen feed through said feed line 19a is controlled by valve 19b. The remainder of oxygen flows through header 19c from which issues a plurality of oxygen feed lines 21 which are provided with individual valves 21a to control the rate of flow of oxygen through each said line 21. Each oxygen feed line 21 combines with a hydrocarbon feed line 15 near the inlet to the tubular reaction zone 17 (hereafter tubular reactor 17) to minimize the reaction of oxygen and the hydrocarbon prior to entering said tubular reactor.

The effluent from tubular reactor 17 flows through exit line 23 and enters cooler 25 wherein the gaseous effluent is partially condensed and the condensate removed. The cooled gaseous products flow through line 27, compressed in compressor 29 and the compressed gases are introduced via line 31 into scrubber 33 wherein they are scrubbed with water which enters the scrubber through line 35.

The scrubbed off gas is withdrawn from scrubber 33 via overhead line 37 and is partially vented to the atmosphere through vent line 39 which is provided with valve 39a. The remaining gas which contains unreacted propane, unreacted propylene, carbon oxides and other cycle gases are recycled via line 41 which combines with said line 1 as mentioned before.

The absorbed reaction products leave scrubber 33 via line 43, heated through heater 45 and introduced via line 47 into a stripping still 49. In this stripper, the reaction products are stripped overhead and are withdrawn via line 51, partially condensed in condenser 55 to provide a reflux for the stripping still. The partially condensed stripper products are introduced via line 57 into a reflux drum 59. The liquid from the reflux drum is recycled via line 61 to stripping still 49. The vapors from the reflux drum are withdrawn via line 63, compressed in compressor 65, the compressed gases leaving said compressor via line 67 and cooled in condenser 69. The condensed reaction products from condenser 69 are conveyed via product line 71 to a product storage vessel (not shown). The stripper bottoms are withdrawn via line 53.

The back-mixed reactor can be any reactor wherein the reactants and the reaction products are intimately mixed. Such reactors include a reactor of the type shown in FIGURE 1 herein wherein the back-mixed reactor is shown as a torus reactor. The materials circulate through the torus reactor and thus adequate intermixing of the reactants and the products is insured.

Another type of back-mixed reactor is shown in FIGURE 2 herein wherein the back-mixed reactor is shown simply as a vessel, such as a cylindrical vessel, which is provided with a shaft 10 and agitators 12 to insure intimate and thorough mixing of materials in the back mixed reactor.

Other back mixed reactors include venturi type reactors and double-cone reactors such as those described in the aforementioned patent to Lemon et al.

Since the amount of feed to the back mixed reactor is preferably no more than 10 percent of the total feed to the dilution reactor, the size of the back mixed reactor need not be large. This of course is of great practical significance in industrial operation wherein large quantities of materials are handled.

Although packings can be employed in the back mixed reactor to provide increased surface-to-volume ratio for the reaction, the process of this invention can be effected without using packing materials in the back-mixed reactor. This is due to the fact that the volume of the back-mixed reactor is ordinarily a small fraction of the total volume (volume of the dilution reactor).

The amount of hydrocarbon feed to the back-mixed reactor can vary from about 0.01 percent to about 50 percent (by volume) of the total feed to the dilution reactor. It is preferable however to introduce from about 1 percent to about 10 percent of the total feed to the back mixed reactor.

The concentration of feed of oxygen or the gas containing molecular oxygen to the back-mixed reactor can vary from about 4 to about 14 percent by volume of oxygen based on the volume of said hydrocarbon feed to this reactor and is preferably from about 6 percent to about 8 percent.

The contact time of the materials in the back-mixed reactor can vary from about 0.07 to about 1.5 seconds, preferably from about 0.1 to about 0.6 second. The contact time in the back-mixed reactor is determined by dividing the volume of the back-mixed reactor by the volumetric flow rate of the vaporous materials in the back-mixed reactor, corrected to the reaction conditions in this reactor.

The reaction in the back-mixed reactor is effected at essentially isothermal temperature of from about 425° C. to about 575° C., preferably from about 450° C. to about 550° C., and the pressure is from about 20 p.s.i.g. to about 150 p.s.i.g., preferably from about 30 p.s.i.g. to about 75 p.s.i.g. The term "essentially isothermal temperature" as employed herein is intended to denote that the temperature variations in the back-mixed reactor do not exceed ±10° C.

Since the reaction is exothermic and large quantities of heat are liberated, the essentially isothermal conditions can be achieved by removing this heat by means of external cooling coils. Alternatively and preferably the reaction is carried out adiabatically by introducing the feed gas at a temperature lower than the desired reaction temperature. Thus, the relatively cold incoming feed gas will absorb the heat liberated in the back-mixed reactor.

As was previously mentioned, the feed to the dilution reactor is preheated (through heater 5 as shown in FIGURES 1 and 2) and part of the preheated feed is introduced to the back-mixed reactor, the remainder being introduced into the tubular reactor. Since it is desired to remove the exothermic heat of the reaction by means of the incoming feed gas it follows that the preheat temperature of the feed must be lower than the reaction temperature prevailing in the back-mixed reactor and the tubular reactor. This preheat temperature can vary over a relatively wide ange and is between about 35° C. to about 400° C. The optimum preheat temperature in each case can be selected on the basis of the heat balance in the reactor and is, to a great degree, related to the percent oxygen in the feed gas as well as the amount of oxygen consumed in the dilution reactor. The greater the amount of oxygen consumed, the greater the quantity of heat which is liberated and therefore the lower the preheat temperature.

The effluent from the back-mixed reactor enters the tubular reactor. The remainder of the hydrocarbon feed and the remainder of oxygen are introduced into the tubular reactor through a plurality of conduits as shown in FIGURES 1 and 2. Each conduit carrying oxygen is combined with a respective conduit carrying the hydrocarbon feed at a point near the injection point to the tubular reactor and the combined oxygen-hydrocarbon streams then enter the tubular reactor through a plurality of inlets (injection points). It is of course desirable to minimize the distance from the point of combination of the oxygen conduit and the hydrocarbon conduit to the inlet point in the tubular reactor in order to avoid or minimize the reaction of oxygen with the hydrocarbon prior to entry into the tubular reactor.

As was previously mentioned, the effluent from the back-mixed reactor enters the tubular reactor. The remaining hydrocarbon feed and oxygen feed enter the tubular reactor through said plurality of inlets along the tubular reactor. At each inlet, the gaseous feed (hydrocarbon and oxygen) is diluted with the gases already flowing in the tubular reactor. The term "dilution reactor" stems from the fact that the feed gas entering through each inlet is diluted by the gases already flowing within the tubular reactor. Similarly in the back-mixed reactor, the feed gas to this reactor is diluted with the gas being recycled (circulated) within this reactor.

The process of this invention is preferably carried out under conditions of constant dilution ratio. The term "dilution ratio" refers to the ratio of volume flow rate of the gas within the reactor to the volume flow rate of the incoming gas at each inlet point. The dilution ratio can vary from about 5:1 to about 100:1 and preferably from about 10:1 to about 30:1. Although it is preferable to maintain a constant dilution ratio within the dilution reactor, the process of this invention can also be carried out under varying dilution ratio within the ranges indicated above.

The concentration of oxygen in the hydrocarbon feed gas entering the tubular reactor through each inlet is essentially constant. As in the case of back-mixed reactor, the oxygen concentration can vary from about 4 to about 14 volume percent, preferably from about 6 to about 8 percent based on the hydrocarbon feed. It is important that the concentration of oxygen as well as the hydrocarbons in the feed gas to both the back-mixed reactor and the tubular reactor be essentially constant. This will result in essentially equal degree of oxygen consumption and hydrocarbon conversion (on a percentage basis) for all stages in the tubular reactor and in the back-mixed reactor. A "stage" represents the distance between two injection points or feed inlets in the dilution reactor. Since the percent conversion of the hydrocarbon and the oxygen consumption is essentially the same for all stages in this dilution reactor, the concentration of the reactants and products remain essentially constant throughout the entire reaction zone.

As in the case of back-mixed reactor, the tubular reactor is preferably maintained under adiabatic condition. This is accomplished by removing the heat of reaction in the tubular reactor by means of the colder incoming gas which, as was previously mentioned, enters the reactor through plurality of inlets located along the length of the reactor. Alternatively, heat removal can be achieved by the use of external cooling coils, etc.

The reaction in the tubular reactor is carried out at an essentially isothermal temperature of from about 425° C. to about 575° C., preferably from about 450° C. to about 550° C., and a pressure of from about 20 to about 150 p.s.i.g., preferably from about 30 to about 75 p.s.i.g.

At the points of injection of the hydrocarbon-oxygen feed to the tubular reactor the incoming feed gas is rapidly and intimately mixed (by using a nozzle, jet or similar means) with the gas flowing through the tubular reactor. Since the incoming gas is at a temperature which is lower than the reaction temperature in the tubular reactor, the mixed gases are cooled to a temperature somewhat lower than the reaction temperature. As the mixed gases flow toward the next injection point, this temperature rises due to the exothermic nature of the reaction and reaches the maximum at a point immediately downstream of the next injection point. Again the gases flowing through the tubular reactor will be cooled by the colder feed entering the tubular reactor through the next inlet, etc. The dilution ratio is so selected that this temperature variation is minimized. The term "essentially isothermal" as employed in connection with the reaction temperature in the tubular reactor is intended to limit the temperature variations to within about ±10° C. Since the oxygen consumption and the degree of hydrocarbon conversion are the same in each stage, the feed gas entering the tubular reactor through said plurality of feed inlets as well as the feed gas entering the back-mixed reactor are preheated to the same extent. In other words, the degree of preheat is the same for all feed streams.

The number of injection points in the tubular reactor depends largely upon the dilution ratio which is employed and the percent volume of the total feed which is introduced into the back mixed reactor. For any given dilution ratio, the smaller the volume of the feed gas to the back mixed reactor, the larger is the remaining feed to the tubular reactor and hence the larger the number of injection points. Once the volume flow rate to the tubular reactor has been determined and the dilution ratio selected, the number of injection points are thereby determined.

The contact time of the materials in the dilution reactor is expressed in terms of a "mean contact time." The latter term is defined as the summation of products of the amount of feed gas entering the dilution reactor at each inlet (including the inlet to the back-mixed reactor) times the length of time that this gas is in the dilution reactor, divided by the total feed gas to the dilution reactor. The calculation of mean contact time as defined herein is more clearly understood with reference to FIGURE 3 wherein a dilution reactor is shown consisting of a back-mixed reactor 11 and a tubular reactor 17. In order to simplify the understanding of the method of calculation of the mean contact time, only three injection points are shown in the tubular reactor. However, the method of calculation described below is equally applicable for any number of injection points.

The amount of feed gas at each inlet represents the combined sum of the hydrocarbon feed and oxygen feed entering the reactor through said inlet. Thus $V_0$ represents the volumetric feed rate of the gas entering the back-mixed reactor and $V_1$, $V_2$, and $V_3$ are the volumetric feed streams to the tubular reactor. Also $t_0$ represents the time, in seconds, in the back-mixed reactor and $t$ is the time, in seconds, between each two injection points and also the time between the last injection point and the exit from the tubular reactor. As will be hereafter described, $t$ is essentially equal for all stages. Thus $V_0$ will be in the dilution reactor for a time which is equal to $t_0+3t$; $V_1$ will be in the tubular reactor for a time equal to $3t$; $V_2$ for a time equal to $2t$, and finally $V_3$ for a time equal to $t$. The mean contact time may thus be calculated by the following equation:

$$\text{Mean Contact Time} = \frac{V_0(t_0+3t)+V_1(3t)+V_2(2t)+V_3(t)}{V_0+V_1+V_2+V_3}$$

The mean contact time of the materials in the dilution reactor can vary from about 0.07 to about 1.5 seconds, preferably from about 0.1 to about 0.6 second. It should also be mentioned that in the calculation of the mean contact time as described above, the disappearance of the reactants throughout the dilution reactor is disregarded.

The mean contact time for the dilution reactor is comparable to the contact time for a back-mixed reactor. The two can be numerically equal in which case the distribution of contact times of the gas in the dilution reactor is the same as the distribution of contact times of the gas in the back-mixed reactor. This means that the percentage of gas that has been in the reactor for any given period of time is the same for both the back-mixed reactor and for the tubular reactor.

Closely akin to the concept of mean contact time is the residence time of the feed gas in the reactor. As was previously defined a stage in the tubular reactor represents the distance or space between each two successive injection points. The residence time for each stage is therefore that length of time which is required for the gases within the reactor to travel through each stage. Since it is preferable to carry out the process of this invention under such conditions that the overall reaction rate and the degree of conversion are essentially the same for each and every stage in the tubular reactor the residence time for each stage is accordingly essentially constant. Thus if $t$ represents the residence time for each stage and $n$ represents the number of stages in the tubular reactor, then the total residence time is $nt$. It should be noted that the time $nt$ is also the contact time for the feed gas which is injected in the first stage of the tubular reactor.

It can be appreciated that the residence time and the means contact time as defined in this invention are closely related. In fact the former can be calculated once the latter has been determined or selected. This can be accomplished by multiplying the amount of feed gas injected at each point by the length of time which is required for that gas to travel through the dilution reactor (in terms of $t$). The sum of these products is divided by the total amount of feed gas to the dilution reactor and the resulting expression is equated to the mean contact time. The resulting equation is then solved for $t$.

The spacing of the injection points in the tubular reactor can be determined by multiplying the linear velocity of the gases through the tubular reactor by the residence time $t$ between successive injection points (a stage). It is preferable to carry out the process of this invention under conditions of constant linear velocity which can vary from about 30 to about 100 feet per second, preferably between about 30 and about 60 feet per second. In practical operation, however, the velocity may vary somewhat from the desired selected constant value. Since the amount of gas flowing through the tubular reactor increases from its upstream end to its downstream end, greater cross sectional area is required to accommodate the increased rate of flow. This may be provided by using a tubular reactor having a gradually increasing cross sectional area such as the tubular reactor shown in FIGURE 1. However as a practical matter, various nominal size pipes are connected to form the tubular reactor. Thus if the desired velocity of the gases throughout the tubular reactor is, say 50 feet per second, the proper nominal size pipe is selected for this velocity for the inlet portion of the tubular reactor. As the amount of flow increases in progressing downstream through the reactor, the next nominal size pipe is selected so as to maintain the velocity as nearly constant as practicable. It should be emphasized however, that by selecting a gradually tapered tubular reactor or by constructing a tubular reactor having a gradually increasing cross section, the velocity of the gases flowing through the tubular reactor can be maintained essentially constant.

Although it has been found preferable to carry out the process of this invention at an essentially constant velocity through the tubular reactor, this process may also be carried out at a variable velocity within the velocity ranges mentioned above. However, it should be emphasized that operation at essentially constant velocity is more desirable and preferable.

As was previously mentioned, it is advantageous to carry out the oxidation reaction described herein in a reactor having large surface-to-volume ratio. The increased surface is obtained by charging the tubular reactor with various packing materials such as those described in the above-mentioned patent to Cook.

The products produced by the process of this invention comprises of from about 30 to about 35 percent propylene oxide, from about 20 to about 25 percent acetaldehyde, the remainder being primarily ethylene oxide, propionaldehyde, acrolein, acetone and some higher boiling oxygenated organic products.

The following examples further illustrate the process of this invention and the unique reactor which is employed therefor.

EXAMPLE 1

The dilution reactor which was employed in this example comprised of a torus reactor (see Perry's Chemical Engineering Handbook, Third edition, page 58) having a volume of 0.085 cubic foot which was connected to a tubular reactor whose cross sectional area increased stepwise from the inlet end to the outlet end of the reactor. The tubular reactor was 33 feet long, had a volume of 0.747 cubic foot and was provided with 24 injection points (inlet nozzles) for the introduction of the feed.

A mixture of propane and propylene constituted the hydrocarbon feed to the dilution reactor. The feed gas was introduced at the rate of 10,000 s.c.f.h. and the oxygen concentration in the feed was 5.5 percent based on the volume of the hydrocarbons. Approximately 10.15 volume percent of the total feed was introduced into the torus reactor, the remaining 89.85% being introduced into the tubular reactor through said injection points.

A constant dilution ratio of 10:1 was maintained throughout the dilution reactor. This means that the amount of gas flowing in the tubular reactor at each injection point was ten times the amount of feed gas injected at that point. Similarly, the volume of gas which was circulated through the torus reactor was ten times the volume of feed gas introduced into that reactor.

The arrangement of the dilution reactor and the product recovery system in this example were essentially as shown in the drawings in FIGURE 1. However, instead of using a tubular reactor with a gradually increasing diameter, the cross sectional area was increased by connecting several nominal size pipes of different diameter so as to maintain the linear velocity of the gases through the tubular reactor at about 30 feet per second with minimum of variation.

The feed to the dilution reactor was preheated to 400° C. Thus the temperature of the various feed stream entering the dilution reactor was the same, i.e., 400° C. Similarly, the concentration of oxygen in each feed stream was 5.5 percent. The distribution of the feed gas in the dilution reactor was as follows:

TABLE I

| Torus reactor Injection Point in Tubular Reactor, No. | Injected flow s.c.f.h. | Cumulative flow s.c.f.h. |
|---|---|---|
|  | 1015 | 1015 |
| 1 | 101 | 1,116 |
| 2 | 112 | 1,228 |
| 3 | 123 | 1,351 |
| 4 | 135 | 1,486 |
| 5 | 149 | 1,635 |
| 6 | 163 | 1,798 |
| 7 | 180 | 1,978 |
| 8 | 198 | 2,176 |
| 9 | 218 | 2,394 |
| 10 | 239 | 2,633 |
| 11 | 263 | 2,896 |
| 12 | 290 | 3,186 |
| 13 | 319 | 3,505 |
| 14 | 350 | 3,855 |
| 15 | 386 | 4,241 |
| 16 | 424 | 4,665 |
| 17 | 467 | 5,132 |
| 18 | 513 | 5,645 |
| 19 | 565 | 6,210 |
| 20 | 621 | 6,831 |
| 21 | 683 | 7,514 |
| 22 | 751 | 8,265 |
| 23 | 825 | 9,091 |
| 24 | 909 | 10,000 |

The dilution reactor was well insulated and hence the reaction was carried out essentially adiabatically. The temperature both in the torus reactor and the tubular reactor was 500° C. and the pressure was 45 p.s.i.g. at the outlet of the tubular reactor. The reaction temperature dropped to 491° C. after entry of the feed at each injection point but rose again to 500° C. before the next injection point.

The mean contact time of the gases in the dilution reactor was 0.50 second which was obtained by proper spacing of the injection points in the tubular reactor. The contact time in the torus reactor was also 0.50 second. The residence time for each stage (distance or space between two successive injection points) was 0.0455 second.

The effluent from the tubular reactor was rapidly cooled to 45° C. in a condenser and the condensate removed. The gaseous materials from the condenser were scrubbed with water to remove propylene oxide and the other oxygenated organic compounds produced in the process. The scrubbed gas was partially vented to maintain the system pressure. The remaining gas which contained propylene and unreacted propane was recycled to the dilution reactor by combining it with fresh propane-propylene.

The scrubber bottoms were treated essentially in the manner shown in FIGURE 1. The resulting products consisted of about 35 weight percent propylene oxide, the remainder being acetaldehyde, propionaldehyde, acrolein and minor quantities of higher boiling oxygenated organic compounds.

EXAMPLE 2

The equipment employed in this example was similar to that in Example 1. The product recovery section was the same but the dilution reactor comprised of a double-cone reactor having a volume of 0.087 cubic foot which was connected to a tubular reactor whose cross sectional area increased stepwise from the upstream to the downstream of the reactor. The double-cone reactor employed in this example was similar in construction and arrangement to the double-cone reactor described in the previously mentioned Lemon et al. patent with the larger conical zone being in free communication with the tubular reactor.

The tubular reactor was 66 feet long, had a volume of 8.23 cubic feet and was provided with 48 injection points (inlets). It was constructed by interconnecting several nominal size pipes of different diameter to provide the stepwise increase in the cross sectional area so as to maintain the velocity of the gases flowing through the tubular reactor at a relatively constant rate of 30 feet per second.

A mixture of propane and propylene constituted the hydrocarbon feed to the dilution reactor. The feed gas was introduced at the rate of 100,000 s.c.f.h. and the oxygen concentration in the feed gas was 5.5 percent based on the volume of the hydrocarbons. Approximately 1.04 percent of the total feed gas was introduced into the double-cone reactor and the remainder (98.96%) was fed to the tubular reactor through said injection points.

A constant dilution ratio of 10:1 was maintained throughout the dilution reactor. This means that the amount of gas flowing in the tubular reactor at each injection point was ten times the amount of gas injected at that point.

The feed to the dilution reactor was preheated to 400° C. and the concentration of oxygen in each feed stream was 5.5 percent. The distribution of the feed gas in the dilution reactor was as follows:

TABLE II

| Double-cone reactor Injection Point in Tubular Reactor, No. | Injected flow s.c.f.h. | Cumulative flow s.c.f.h. |
|---|---|---|
|  | 1,040 | 1,040 |
| 1 | 100 | 1,140 |
| 2 | 110 | 1,250 |
| 3 | 130 | 1,380 |
| 4 | 140 | 1,520 |
| 5 | 150 | 1,670 |
| 6 | 170 | 1,840 |
| 7 | 180 | 2,020 |
| 8 | 200 | 2,220 |
| 9 | 220 | 2,440 |
| 10 | 240 | 2,680 |
| 11 | 270 | 2,950 |
| 12 | 300 | 3,250 |

TABLE II—Continued

| Double-cone reactor Injection Point in Tubular Reactor, No. | Injected flow s.c.f.h. 1,040 | Cumulative flow s.c.f.h. 1,040 |
|---|---|---|
| 13 | 320 | 3,570 |
| 14 | 360 | 3,930 |
| 15 | 390 | 4,320 |
| 16 | 430 | 4,750 |
| 17 | 470 | 5,220 |
| 18 | 520 | 5,740 |
| 19 | 570 | 6,310 |
| 20 | 630 | 6,940 |
| 21 | 690 | 7,630 |
| 22 | 760 | 8,390 |
| 23 | 840 | 9,230 |
| 24 | 920 | 10,150 |
| 25 | 1,010 | 11,160 |
| 26 | 1,120 | 12,280 |
| 27 | 1,230 | 13,510 |
| 28 | 1,350 | 14,860 |
| 29 | 1,490 | 16,350 |
| 30 | 1,630 | 17,980 |
| 31 | 1,800 | 19,780 |
| 32 | 1,980 | 21,760 |
| 33 | 2,180 | 23,940 |
| 34 | 2,390 | 26,330 |
| 35 | 2,630 | 28,960 |
| 36 | 2,900 | 31,860 |
| 37 | 3,190 | 35,050 |
| 38 | 3,500 | 38,550 |
| 39 | 3,860 | 42,410 |
| 40 | 4,240 | 46,650 |
| 41 | 4,670 | 51,320 |
| 42 | 5,130 | 56,450 |
| 43 | 5,650 | 62,100 |
| 44 | 6,210 | 68,310 |
| 45 | 6,830 | 75,140 |
| 46 | 7,510 | 82,650 |
| 47 | 8,260 | 90,910 |
| 48 | 9,090 | 100,000 |

The dilution reactor was well insulated and hence the reaction was carried out essentially adiabatically. The reaction temperature in both the double-cone reactor and the tubular reactor was 500° C. and the pressure was 45 p.s.i.g. at the outlet of the tubular reactor. The reaction temperature dropped to 491° C. at each injection point but rose again to 500° C. before the next injection point.

The mean contact time of the gases in the dilution reactor was 0.50 second which was attained by proper spacing of the injection points in the tubular reactor. The contact time in the double-cone reactor was also 0.50 second. The residence time for each stage in the tubular reactor was 0.0454 second.

The effluent from the tubular reactor was treated as in Example 1 and the products produced contained approximately 35 weight percent propylene oxide. The remaining products were acetaldehyde, propionaldehyde, acrolein and minor amounts of higher boiling oxygenated organic compounds.

EXAMPLE 3

The equipment employed in this example was essentially the same as in Example 1 except that the dilution reactor comprised of a venturi type back-mixed reactor connected to a tubular reactor. The venturi type reactor employed herein is essentially similar to the venturi reactor described by Lemon et al. in the aforementioned patent (U.S. 3,132,156).

The venturi reactor had a volume of 0.101 cubic foot. The tubular reactor was 40 feet long, had a volume of 0.897 cubic foot and its cross sectional area increased stepwise from its upstream end to its downstream end. The tubular reactor was constructed in the same manner as the tubular reactors of the preceding examples to maintain the velocity of the gases flowing therethrough at a relatively constant velocity of 30 feet per second. Furthermore, the tubular reactor was provided with 47 injection points.

A mixture of propane and propylene constituted the hydrocarbon feed to the dilution reactor. The feed gas was introduced at the rate of 10,000 s.c.f.h. and the oxygen concentration in the feed gas was 8.5 percent based on the volume of the hydrocarbons. Approximately 10.10 percent of the feed gas was introduced into the venturi reactor. The remaining 89.90 percent being introduced into the tubular reactor through said injection points.

A constant dilution ratio of 20:1 was maintained throughout the dilution reactor. The feed to the dilution reactor was preheated to 300° C. and the concentration of oxygen was 8.5 percent in each feed stream. The distribution of feed in the dilution reactor was as follows:

TABLE III

| Venturi reactor Injection Point in Tubular Reactor, No. | Injected flow s.c.f.h. 1,010 | Cumulative flow s.c.f.h. 1,010 |
|---|---|---|
| 1 | 50 | 1,060 |
| 2 | 53 | 1,113 |
| 3 | 56 | 1,169 |
| 4 | 58 | 1,227 |
| 5 | 61 | 1,288 |
| 6 | 64 | 1,352 |
| 7 | 68 | 1,420 |
| 8 | 71 | 1,491 |
| 9 | 75 | 1,566 |
| 10 | 78 | 1,644 |
| 11 | 82 | 1,726 |
| 12 | 86 | 1,812 |
| 13 | 91 | 1,903 |
| 14 | 95 | 1,998 |
| 15 | 100 | 2,098 |
| 16 | 105 | 2,203 |
| 17 | 110 | 2,313 |
| 18 | 116 | 2,429 |
| 19 | 121 | 2,550 |
| 20 | 128 | 2,678 |
| 21 | 134 | 2,812 |
| 22 | 141 | 2,953 |
| 23 | 148 | 3,101 |
| 24 | 155 | 3,256 |
| 25 | 163 | 3,419 |
| 26 | 171 | 3,590 |
| 27 | 180 | 3,770 |
| 28 | 188 | 3,958 |
| 29 | 198 | 4,156 |
| 30 | 208 | 4,364 |
| 31 | 218 | 4,582 |
| 32 | 229 | 4,811 |
| 33 | 241 | 5,052 |
| 34 | 253 | 5,305 |
| 35 | 265 | 5,570 |
| 36 | 278 | 5,848 |
| 37 | 292 | 6,140 |
| 38 | 307 | 6,447 |
| 39 | 322 | 6,769 |
| 40 | 338 | 7,107 |
| 41 | 355 | 7,462 |
| 42 | 373 | 7,835 |
| 43 | 392 | 8,227 |
| 44 | 411 | 8,638 |
| 45 | 432 | 9,070 |
| 46 | 454 | 9,524 |
| 47 | 476 | 10,000 |

The dilution reactor was well insulated and as in the previous two examples the reaction was carried out essentially adiabatically. The reaction was carried out at a temperature of 500° C. in both reactors. This temperature dropped to 490° C. at each injection point due to introduction of colder feed but rose again to 500° C. before the next injection point.

The mean contact time for the dilution reactor was 0.60 second which was attained by proper spacing of the injection points along the tubular reactor. The residence time in each stage was 0.0286 second.

The effluent from the tubular reactor was treated as in the previous two samples. The resulting products contained about 35 weight percent propylene oxide, the remainder being acetaldehyde, propionaldehyde, acrolein, and minor amounts of some higher boiling oxygenated organic compounds.

From the foregoing detailed description it can be readily appreciated that a judicious selection of the different variables and a careful consideration of the criticality of their combined effect upon the process of this invention are of paramount importance. The significance of the inter-relationship of the several variables in the process of this invention cannot be too strongly emphasized.

It is also understood that the present invention is subject to several minor modifications and revisions both with respect to the dilution reactor and the arrangement of its associated parts, as well as the process itself without substantial departure from the spirit or scope of this invention. For example, the preheating of the feed to the dilution reactor can be achieved in a heat exchanger wherein the heating medium employed is the effluent from the tubular reactor. Also, the product recovery section can be modified to adapt it to each particular operation.

The dilution reactor itself it subject to several minor mechanical modifications. The underlying inventive concept in the design of the dilution reactor is that it basically consists of two reactors; a back-mixed reactor designed to handle part of the total feed, i.e., from about 0.01 to about 50 volume percent, preferably from about 1 to about 10 volume percent, and a second tubular reactor which is provided with a plurality of injection points located along the length of this reactor for the introduction of the remainder of the feed. The two reactors are in series and freely communicating, the effluent from the back-mixed reactor entering the inlet end of the tubular reactor.

As was previously mentioned, the cross sectional area of the tubular reactor increases from its upstream end to its downstream end. The increase in the cross sectional area is necessary to accommodate the increased amount of gases flowing through the tubular reactor in progressing toward its downstream end in order to maintain a relatively constant velocity of the gases flowing through the tubular reactor. This can be accomplished by providing a tubular reactor having a gradually increasing cross section. As was pointed out, however, it is more practical when operating on an industrial scale to employ a reactor wherein the cross sectional area is increased in a stepwise manner. This can be accomplished by interconnecting several pipes of different nominal size wherein the cross sectional area is enlarged in stepwise manner from the inlet to the outlet of the tubular reactor. This arrangement results in some variation in the velocity of the gases flowing through each section. However, this variation can be minimized by selecting the appropriate length and nominal size of the pipe.

The feed gas to the tubular reactor can be introduced through mixing jets or nozzles to insure thorough mixing of the feed gas with the gases already within the tubular reactor. Similarly, when using a torus back-mixed reactor, the hydrocarbon-oxygen feed can be introduced through a jet or a mixing nozzle to insure adequate mixing of the gaseous feed.

What is claimed is:

1. A process for the oxidation of a hydrocarbon selected from the group consisting of ethane, propane and butane to produce the corresponding olefin oxide which process comprises:
   (a) introducing from about 0.01 to about 50 percent by volume of said hydrocarbon into a back-mixed reaction zone together with from about 4 to about 14 percent by volume of oxygen based on the volume of said hydrocarbon.
   (b) reacting said hydrocarbon with said oxygen in said back-mixed reaction zone under essentially complete back-mixed conditions with respect to the reactants and the reaction products, and essentially adiabatically at reaction temperature ranging from about 425° C. to about 575° C. and a pressure of from about 20 p.s.i.g. to about 150 p.s.i.g.
   (c) introducing the effluent from said back-mixed reaction zone into a tubular reaction zone connected in series to and communicating freely with said back-mixed reaction zone,
   (d) introducing the remaining feed together with oxygen into said tubular reaction zone through a plurality of of inlets disposed along said tubular reaction zone,
   (e) maintaining essentially the same oxygen concentration of from about 4 to about 14 percent by volume based on the volume of the hydrocarbon feed through each said inlet,
   (f) maintaining a dilution ratio of from about 5:1 to about 100:1 in said reaction zones,
   (g) effecting the oxidation of said hydrocarbon feed in said tubular reaction zone essentially adiabatically at reaction temperature of from about 425° C. to about 575° C. and a pressure of from about 20 p.s.i.g. to about 150 p.s.i.g.
   (h) maintaining a contact time of from about 0.07 to about 1.5 seconds in said back-mixed reaction zone and a mean contact time of from about 0.07 to about 1.5 seconds in said tubular reaction zone, and
   (i) removing the effluent from said tubular reaction zone and recovering the olefin oxide produced in the reaction.

2. The process of claim 1 wherein the hydrocarbon feed is a mixture of at least one of said hydrocarbons and its corresponding olefin.

3. The process of claim 1 wherein the feed to said back-mixed reaction zone is from about 1 to about 10 percent by volume of said feed.

4. The process of claim 1 wherein the unreacted hydrocarbon is recycled to said back-mixed reaction zone.

5. The process of claim 2 wherein the unreacted hydrocarbon feed is recycled to said back-mixed reaction zone.

6. The process of claim 1 wherein the temperature in each of said reaction zones is in the range of from about 450° C. to about 550° C. and the pressure in each of said zones is from about 30 p.s.i.g. to about 75 p.s.i.g.

7. The process of claim 2 wherein the feed to said back-mixed reaction zone is from about 1 to about 10 percent by volume of said feed.

8. The process of claim 1 wherein said dilution ratio in said reaction zones is essentially constant and ranges from about 5:1 to about 100:1.

9. The process of claim 1 wherein said dilution ratio is from about 10:1 to about 30:1.

10. The process of claim 8 wherein said dilution ratio is from about 10:1 to about 30:1.

11. The process of claim 2 wherein the reaction temperature in both said reaction zones is in the range of from about 450° C. to about 550° C. and the pressure in each of said zones is in the range of from about 30 p.s.i.g. to about 75 p.s.i.g.

12. The process of claim 1 wherein the mean contact time in said reaction zones is from about 0.1 to about 0.6 second.

13. The process of claim 2 wherein the mean contact time in said reaction zones is from about 0.1 to about 0.6 second.

14. The process of claim 1 wherein said hydrocarbon is oxidized with a gas containing molecular oxygen.

15. The process of claim 2 wherein said hydrocarbon is oxidized with a gas containing molecular oxygen.

16. The process of claim 4 wherein said hydrocarbon is oxidized with a gas containing molecular oxygen.

17. The process of claim 6 wherein said hydrocarbon is oxidized with a gas containing molecular oxygen.

18. A process for the oxidation of propane to propylene oxide which process comprises:
   (a) introducing from about 0.01 to about 50 percent by volume of a feed consisting essentially of propane into a back-mixed reaction zone together with from about 4 to about 14 percent by volume of oxygen based on the volume of said propane,
   (b) reacting said propane with said oxygen in said back-mixed reaction zone under essentially complete back-mixed conditions with respect to the reactants and the reaction products, and essentially adiabatically at reaction temperature of from about 25° C. to about 575° C. and a pressure of from about 20 ps.i.g. to about 150 p.s.i.g.
   (c) introducing the effluent from said back-mixed reaction zone into a tubular reaction zone connected in series to and communicating freely with said back-mixed reaction zone, (d) introducing the remaining feed together with oxygen into said tubular reactor through a plurality of inlets disposed along said tubular reaction zone, (e) maintaining essentially the same oxygen concentration of from about 4 to about 14 percent by volume based on the volume of the propane feed through each said inlet, (f) maintaining a dilution ratio of from about 5:1 to about 100:1 in said reaction zones, (g) effecting the oxidation of said propane in said tubular reaction zone essentially adiabatically at reaction temperature of from about 425° C. to about 575° C. and a pressure of from about 20 p.s.i.g. to about 150 p.s.i.g., (h) maintaining a contact time of from about 0.07 to 1.5 seconds in said back-mixed reaction zone and a mean contact time of from about 0.07 to about 1.5 seconds in said tubular reaction zone, and (i) removing the effluent from said tubular reaction zone and recovering the propylene oxide product in the reaction.

19. The process of claim 18 wherein the feed to said reaction zones is a mixture of propane and propylene.

20. The process of cliam 18 wherein the propane feed to said back-mixed reaction zone is from about 1 to about 10 percent by volume of the total propane feed.

21. The process of claim 18 wherein the unreacted propane and propylene are recycled to said back-mixed reaction zone.

22. The process of claim 18 wherein the temperature in each of said reaction zones is in the range of from about 450° C. to about 550° C. and the pressure in each of said zones is from about 30 p.s.i.g. to about 75 p.s.i.g.

23. The process of claim 19 wherein the hydrocarbon feed to said back-mixed reaction zone is from about 1 to about 10 percent by volume of the total propane feed.

24. The process of claim 18 wherein the dilution ratio in said reaction zones is essentially constant and ranges from about 5:1 to about 100·1.

25. The process of claim 18 wherein said dilution ratio is from about 10:1 to about 30:1.

26. The process of claim 24 wherein said dilution ratio is from about 10:1 to about 30:1.

27. The process of claim 19 wherein the reaction temperature in both said reaction zones is in the range of from about 450° C. to about 550° C. and the pressure in each of said zones is from about 30 p.s.i.g. to about 75 p.s.i.g.

28. The process of claim 18 wherein the mean contact time in said reaction zones is from about 0.1 to about 0.6 second.

29. The process of claim 19 wherein the mean contact time in said reaction zones is from about 0.1 to about 0.6 second.

30. The process of claim 18 wherein said propane is oxidized with a gas containing molecular oxygen.

31. The process of claim 19 wherein said propane-propylene feed is oxidized with a gas containing molecular oxygen.

32. The process of claim 21 wherein said propane-propylene is oxidized with a gas containing molecular oxygen.

33. The process of claim 22 wherein said oxygen concentration is from about 4 to about 10 percent by volume based on the volume of propane feed.

34. The process of claim 27 wherein said oxygen concentration is from about 4 to about 10 percent by volume based on the volume of propane-propylene feed to the reaction zones.

References Cited

UNITED STATES PATENTS 3,085,106  4/1963  Fenske et al. _____ 260—451
3,132,156  3/1964  Lemon et al. _____ 260—348.5

OTHER REFERENCES

Chemicals From Hydrocarbons by Vapor Phase Oxidation, by Jones & Fenske, Ind. and Eng. Chem., 51, No. 3, 262–66 (1959).

Fundamentals of Thermodynamics, Adams et al., 1945, pp. 37–38.

HENRY R. JILES, Primary Examiner

S. D. WINTERS, Assistant Examiner

U.S. Cl. X.R.

260—687; 23—284

PO-1050
(5/69)

UNITED STATES PATENT OFFICE
CERTIFICATE OF CORRECTION

Patent No. 3,483,229          Dated December 9, 1969

Inventor(s) Donald A. Bernard

It is certified that error appears in the above-identified patent and that said Letters Patent are hereby corrected as shown below:

Column 14, line 68, "25°C." should read -- 425°C. --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents